United States Patent Office 3,394,029
Patented July 23, 1968

3,394,029
POLYOLEFINS COATED WITH TERPENE
ACRYLATE POLYMERS
Norman C. MacArthur, Avondale, Pa., assignor to Hercules Incorporated, a corporation of Delaware
No Drawing. Filed Feb. 24, 1965, Ser. No. 435,071
6 Claims. (Cl. 117—138.8)

ABSTRACT OF THE DISCLOSURE

Polyolefin surfaces are coated with homopolymers of terpene acrylates, N-terpene acrylamides or interpolymers thereof with other ethylenically unsaturated monomers whereby increased resistance to oxidation of the surfaces and increased adhesion when coated with conventional lacquers is obtained.

---

This invention relates to modification of the surfaces of polyolefin materials and, more particularly, to use of certain modified acrylic polymers for coating polyolefins, and the resulting products.

The recent production of polyolefins in the form of films, fibers, and molded or extruded objects has raised problems of altering the surface of these materials to give them improved heat sealability, printability, dye receptivity, and coatability for both protective and decorative purposes. In the past, coating of polyolefins with conventional vehicles has been carried out following treatment of the polyolefin surface with refluxing chlorinated hydrocarbons. This treatment produces an adherable surface but also produces toxicity hazards and causes large objects to change their shapes.

In accordance with this invention it has been found that certain terpene acrylic polymers adhere readily to untreated polyolefin surfaces, leave the surfaces stable to oxidation even at high temperature, and render these polyolefin surfaces coatable with conventional lacquers. The terpene acrylic polymers used in accordance with this invention are prepared by polymerization of the reaction product of a bicyclic terpene residue, or derivatives thereof, with acrylic acid, acrylonitrile, or α-substituted acrylic acid or acrylonitrile. These reaction products are terpene acrylic esters and terpene acrylamides which may be illustrated by the following formulae:

wherein: R is H, lower alkyl, halo-lower alkyl, hydroxy-lower alkyl, or halogen; and R' is a bicyclic terpene group. These terpene acrylate reaction products can be homopolymerized, or copolymerized with one or more olefinic monomers to produce coating compositions for surface modification of polyolefin materials. Homopolymers of these terpene acrylate reaction products have a strong adherence to untreated polyolefins and are stable to oxidation and therefore extremely useful for modifying the surfaces of polyolefin molded or extruded objects, film, and fibers. The terpene acrylate reaction product, when copolymerized with a wide range of other olefinic monomers, produces interpolymers which have sufficient compatibility to allow a polyolefin surface which has been coated therewith to be recoated with many of the commonly used coating systems.

Generally, any bicyclic terpene compound or derivatives thereof, such as chlorinated derivatives, can be used in accordance with this invention. Examples of terpene compounds which are suitable for use in producing the terpene acrylate reaction products of this invention include camphene, β-pinene, αfenchene, β-fenchene, and sabinene. Camphene is the preferred terpene monomer.

The terpene compound is reacted with an acrylic compound by a conventional acid-catalyzed reaction process to produce the terpene acrylate reaction product.

The acrylic compound used to produce this reaction product can be acrylic acid, acrylonitrile, or various α-substituted acrylic acid or acrylonitrile compounds. Suitable α-substituents include lower alkyl, halo-lower alkyl, hydroxy-lower alkyl, and halogen groups. Specific acrylic compounds which can be used include acrylic acid, acrylonitrile, methacrylic acid, methacrylonitrile, α-ethyl acrylic acid, α-propyl acrylic acid, α-butyl acrylic acid, α-chloroacrylic acid, α-bromo acrylic acid, α-chloroethyl acrylic acid, α-hydroxy ethyl acrylic acid, α-chloromethyl acrylic acid, α-bromomethyl acrylic acid, and the like. Preferred acrylic monomers are acrylic acid, methacrylic acid, acrylonitrile, and methacrylonitrile.

The terpene acrylate reaction product is then polymerized by a conventional free radical initiated process either alone, to produce a homopolymer, or with one or more other copolymerizable olefinic monomers, to produce a copolymer or interpolymer.

Monomers which can be copolymerized with the terpene acrylate reaction product to produce the copolymers or interpolymers of this invention include generally any ethylenically unsaturated monomer such as, for example, vinyl, vinylidene or vinylene monomers. Specific examples of suitable ethylenically unsaturated monomers include acids and anhydrides such as acrylic acid, methacrylic acid, and maleic anhydrides; esters such as methyl acrylate, ethyl acrylate, propyl acrylate, butyl acrylate, octyl acrylate, methyl α-chloroacrylate, ethyl α-chloroacrylate, propyl α-chloroacrylate, butyl α-chloroacrylate, β-chloroethyl acrylate, β-chloropropyl acrylate, β-chlorobutyl acrylate, methyl methacrylate, ethyl methacrylate, propyl methacrylate, butyl methacrylate, diethyl maleate, diethyl fumarate, hydroxyethyl acrylate, hydroxyethyl methacrylate; vinyl esters such as allyl acetate, allylchloroacetate, methallyl acetate, vinyl acetate, isopropenyl acetate; halides such as vinyl chloride, vinylidene chloride, allyl chloride, 1,2-dichloropropene-2, methallyl chloride and trichloroethylene; nitriles such as acrylonitrile and methacrylonitrile; aryls such as styrene, o-methyl styrene, m-methyl styrene, p-methyl styrene, pentachlorostyrene, o-chlorostyrene, m-chlorostyrene, p-chlorostyrene, m-bromostyrene, p-bromostyrene, 2,5-dichlorostyrene, p-dimethylaminostyrene, p-methoxystyrene and p-cyanostyrene; dienes such as butadiene and chloroprene, vinyl-substituted heterocyclic imines such as 2-vinylpyridine and vinyl carbazole; vinyl ketones such as methyl vinyl ketone.

The ratio of terpene acrylate monomer to comonomer or comonomers is between about 20:1 and about 1:4, and preferably between about 4:1 and about 1:1.

One or more of these monomers can be copolymerized with the terpene acrylate monomer to produce the copolymer or interpolymer coating compositions of this invention. The selection of monomers may be varied to produce a wide variety of polymer properties, i.e., hard, soft, tough, brittle, depending on the particular use contemplated. For example, compositions with functionality for cross-linking via heat or catalysis after application can be produced.

Application of the terpene acrylate homopolymer or terpene acrylate—olefinic monomer interpolymer to the polyolefin surface may be carried out by spraying, dipping, spreading with a knife or roller, as a curtain, or by other conventional means. Application temperatures ranging from room temperature to about 65° C. are generally satisfactory though higher and lower temperatures (except those above the melting point of the polyolefin) can be used. After the polymer coating composition has been distributed on the polyolefin surface, it is dried either at an elevated temperature or at room temperature. The thickness of the coating applied to the polyolefin surface can be varied widely depending upon the intended purpose. When nonwoven polyolefin fibers are being coated, the amount of polymer can again be widely varied but generally about 10% to about 50% by weight of the fibers will be used. Much less polymer is used for coating woven polyolefin fibers (generally about 1–10%).

The coating layer thus produced has excellent adherence to the polyolefin surface, is resistant to oxidation, and has good thermal stability. It has been found, for example, that the homopolymers are stable in air at over 200° C. When copolymer or interpolymer coatings are used, they serve as an excellent primer for recoating with conventional coating compositions such as nitrocellulose lacquer, acrylic lacquers, cellulose acetate butyrate lacquers, alkyd amine enamels, phenolic and urea resin compositions, and the like.

The polyolefins which can be coated with the above-described polymers include polyethylene and polypropylene. Use of the terpene acrylate polymers of this invention for coating polypropylene surfaces produces particularly noteworthy results.

Pigments or printing inks may be incorporated in the coating compositions of this invention to produce colored or printed surfaces on the polyolefin materials.

The following examples will illustrate the use of the polymers of this invention in coating polyolefins, and the resulting coated products. All parts and percentages are by weight unless otherwise indicated. The molecular weight of the polymer is indicated by its Reduced Specific Viscosity (RSV). By the term "Reduced Specific Viscosity" is meant the $\eta_{sp}/c$ as measured on a 0.1% solution of the polymer in a given solvent at a given temperature.

Example 1

A polymerization tube is charged with 10 grams of isobornyl acrylate, 10 grams of chemically pure toluene, and 0.05 gram of benzoyl peroxide. The tube is capped, evacuated and filled with nitrogen three times, and heated to 80° C. The tube is held at 75–85° C. for three hours, and the viscous solution thereby produced is added dropwise to ten volumes of methanol. The soft, wet mass of polymer which precipitates is cut into small pieces and dried overnight at 60° C. in vacuo. A foamed mass of white polymer (poly(isobornyl acrylate)) results. It is easily ground to a finely divided state in a mortar, weighs 7.9 grams, and has an RSV of 0.2 (0.1% in ethylene dichloride at 25° C.).

Example 2

The polymerization procedure of Example 1 is duplicated exactly, with the isobornyl acrylate monomer there used being replaced by 10 grams of isobornyl α-chloromethyl acrylate. The resulting product is about 5.0 grams of polymer (poly(isobornyl α-chloromethyl acrylate)) having an RSV of about 0.1 (0.1% in ethylene dichloride at 25° C.).

Example 3

A polymerization tube is charged with 5 grams of N-isobornylacrylamide, 20 grams of ethanol and 0.025 gram of benzoyl peroxide. The tube is capped, three times evacuated and filled with nitrogen, and heated to 75° C. In less than 30 minutes copious amounts of polymer are precipitated. The suupernatant liquid is decanted and the polymer dissolved in 20 grams of benzene. The polymer is precipitated by adding this solution dropwise to ten volumes of methanol. It is collected and dried overnight at 60° C. in vacuo. A white, hard polymer having an RSV of 0.2 (0.1% in ethylene dichloride at 25° C.), results.

Example 4

A solution of the homopolymer prepared in Example 3 (poly(N-isobornylacrylamide)) is prepared using 2 grams of the polymer and 8 grams of xylene. An untreated injection molded stereoregular polypropylene plaque is roller-coated with this solution and baked for 30 minutes at 150° C. to obtain a dried coating thickness of about 0.2–0.5 mil. The adhesion of this coating to the polypropylene plaque is evaluated by crosshatching a one square inch area of the plaque surface with razor blade cuts, ⅛ inch apart and at right angles to each other, applying a strip of conventional transparent pressure-sensitive "Cellophane" tape firmly to this area, jerking the tape from the surface, and observing what part, if any, of the coating is removed by the tape. In this test a rating of "excellent" is assigned if no coating is stripped from the plaque; a rating of "good" if less than 25% of the coating is stripped; a rating of "fair" if 25–50% of the coating is stripped; a rating of "poor" if 50–75% of the coating is stripped; and a rating of "very poor" if more than 75% of the coating is stripped. The adhesion rating of rating of the coating tested in this example is "excellent."

Example 5

A solution of the polymer prepared in Example 1, comprising two grams poly(isobornylacrylate) and 8 grams of xylene, is roller coated on an untreated stereoregular polypropylene plaque. The coating is baked at 150° C. for 30 minutes. The adhesion of the coating to the plaque is tested by the crosshatch tape test and receives a "good" rating.

Example 6

A 10% solution of the polymer produced in Example 1 in toluene is roller coated on an untreated stereoregular polypropylene plaque and baked for 30 minutes at temperatures down to 110° C. Clear, glossy coatings which have an adhesion rating of "good" by the crosshatch tape test result.

Examples 7–10

In these examples four samples of a 50% solution of the poly(isobornylacrylate) polymer prepared in Example 1 are applied to various polyolefin substrates with a rubber roller. The resulting coatings are hot air dried, cooled to room temperature and checked for adhesion by a modified tape test.

In these examples the tape test used is the same as that described in Example 4 except that the coated surface is not crosshatched before the tape is applied. An "excellent" rating is assigned if none of the coating is stripped off, and a "good" rating is assigned if less than 10% of the coating is stripped off the coated surface. Table I indicates the ratings achieved in these tests.

TABLE I

| Example No.: | Substrate | Adhesion Rating |
|---|---|---|
| 7 | Corona-treated, essentially linear, high density polyethylene film. | Good. |
| 8 | Corona-treated, stereoregular polypropylene film. | Do. |
| 9 | Untreated, essentially linear, high density polyethylene bottle. | Excellent. |
| 10 | Untreated stereoregular polypropylene plaque. | Do. |

Example 11

A copolymer of isobornyl acrylate and octyl acrylate is prepared by a procedure similar to that of Example 1. The monomer charge is 70% isobornyl acrylate and 30% octyl acrylate. The precipitated air-dried polymer is dissolved in xylene and the solution used to roller coat an untreated stereoregular polypropylene plaque. The wet coating is air dried for 20–30 minutes and then baked for 30 minutes at 150° C. Adhesion by the crosshatch test rates "excellent."

This coated panel is then recoated with a clear nitrocellulose lacquer by spraying. The top coating is dried for one hour at 75° C. and then tested by the crosshatch tape test. The lacquer lifts readily in the area where no primer has been used, but, when the copolymer primer coated area is encountered, a definite effort is required to continue the peeling.

Example 12

The procedure of Example 11 is repeated using a copolymer of 80% isobornyl acrylate and 20% styrene. The coating of this copolymer in xylene on an untreated stereoregular polypropylene plaque has an adhesion rating by the crosshatch tape test of "good."

Example 13

The procedure of Example 11 is repeated using a copolymer of 80% isobornyl acrylate and 20% vinylidene chloride (RSV of copolymer in 0.1% ethylene dichloride at 25° C.=0.16). The coating of this copolymer on an untreated stereoregular polypropylene plaque has an adhesion rating by the crosshatch tape test of "good."

Example 14

A solution of poly(isobornyl acrylate) (prepared as in Example 1) is prepared from 4 grams of polymer and 16 grams of toluene. This solution is applied to both corona-treated and untreated 50-gage polypropylene films. The coated film is dried for about 30 seconds with a hot air drier and then for 2 days at room temperature. Coating adhesion is tested by the crosshatch tape test and rates "excellent" for the untreated film and "good" for the treated film. Both coated films retain their good adhesion when heat sealed with a bar sealer at 290° F. and 20 p.s.i. for ¼ second.

Example 15

Polypropylene fibers, 30 denier, 1½ inches in length and crimped, are carded into webs. A binder of 70/30 isobornyl acrylate—octyl acrylate copolymer, in an amount equal to 25% by weight of the fibers, is applied to the fibers as a spray. The sprayed webs are then placed in a vacuum oven, without previous air drying, and the solvent is removed at room temperature and a pressure of about 2 inches of mercury absolute for a period of 1.5 hours. The temperature inside the oven is then raised to 150° C. in about 2 hours and there maintained for 30 minutes. The resultant nonwoven fabric has a Mullen burst strength of 11.8 p.s.i./oz./yd.$^2$.

Example 16

Another web of the fibers used in Example 15 is coated with another sample of the copolymer used in that example. Here the amount of binder used is 41% by weight of the fibers. The sprayed web is air dried overnight and then cured on a drum drier at 305° F. for 50 minutes. The resulting fabric has a Mullen burst strength of 16 p.s.i./oz./yd.$^2$.

Obviously many modifications and variations of the above-described invention may be made without departing from the spirit and scope thereof, and only such limitations as are indicated by the appended claims should be placed thereon.

What I claim and desire to protect by Letters Patent is:

1. A coated polyolefin product comprising a polyolefin material having distributed and dried on its surface a polymer selected from the group consisting of: (1) a homopolymer of a compound having a formula selected from the group consisting of:

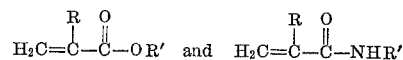

wherein R is a radical selected from the group consisting of hydrogen, lower alkyl, halo-lower alkyl, hydroxy-lower alkyl, and halogen, and R' is a bicyclic terpene radical; and (2) an interpolymer of said compound with at least one other ethylenically unsaturated monomer, in which the ratio of said compound to ethylenically unsaturated monomer is from 20:1 to 1:4 and said ethylenically unsaturated monomer is selected from the group consisting of vinylidene and vinylene monomers capable of free radical polymerization.

2. The product of claim 1 wherein R' is an isobornyl radical.

3. The product of claim 2 wherein the polymer is poly (isobornyl acrylate).

4. The product of claim 2 wherein the polymer is poly (isobornyl acrylamide).

5. The product of claim 1 wherein the polyolefin material is polypropylene.

6. The product of claim 1 wherein the polyolefin material is polyethylene.

References Cited

UNITED STATES PATENTS 2,968,576   1/1961   Keller et al. _____ 117—138.8 X
3,222,339   12/1965  Fellmann et al. ___ 260—89.7 X
3,255,034   6/1966   Covington et al. __ 117—138.8 X WILLIAM D. MARTIN, *Primary Examiner.*

J. E. MILLER, *Assistant Examiner.*